United States Patent [19]
Whittingham

[11] 3,876,170

[45] Apr. 8, 1975

[54] AIRCRAFT ARRESTER GEAR

[75] Inventor: Ronald Arthur Whittingham, Bedford, England

[73] Assignee: The Secretary of State for Defence in Her Britannic Majesty's Government of the United Kingdom of Great Britain and Northern Ireland, Whitehall, London, England

[22] Filed: Nov. 16, 1973

[21] Appl. No.: 416,450

[30] Foreign Application Priority Data
Nov. 16, 1972 United Kingdom............... 52892/72

[52] U.S. Cl............................................ 244/110 C
[51] Int. Cl................................................ B64f 1/02
[58] Field of Search ...................... 244/110 R, 110 C

[56] References Cited
UNITED STATES PATENTS

| | | | |
|---|---|---|---|
| 3,069,118 | 12/1962 | Bernard | 244/110 R |
| 3,383,076 | 5/1968 | Van Zelm et al. | 244/110 C |
| 3,468,500 | 9/1969 | Carlsson | 244/110 C |
| 3,622,107 | 11/1971 | Bernard | 244/110 C |
| 3,738,599 | 6/1973 | Borehag | 244/110 C |

*Primary Examiner*—Trygve M. Blix
*Assistant Examiner*—Paul E. Sauberer
*Attorney, Agent, or Firm*—Cameron, Kerkam, Sutton, Stowell & Stowell

[57] ABSTRACT

An aircraft arrester net for deployment across a landing path in association with energy absorption apparatus on either side thereof, the net comprising at least two groups of subnets, where each subnet comprises a top edge member and a bottom edge member and a plurality of vertical members extending normally between the edge members, the vertical members in one group of subnets being more widely spaced apart than those in another, and the subnets being bunched together with the vertical members staggered as between subnets. The members are preferably fabricated of nylon tape.

10 Claims, 3 Drawing Figures

3,876,170

AIRCRAFT ARRESTER GEAR

BACKGROUND OF THE INVENTION

The present invention relates to arrester gear, and particularly to barrier nets for the arrest of aircraft which in the course of landing or abandoning take-off otherwise fail to stop on the runway. Such arrester nets are usually supported vertically by stanchions until engaged, and are associated with energy absorption means on either side of the runway. Moreover the stanchions are usually arranged to fold and to lay the net on the ground, under control from the control tower. Such nets may thus be deployed one at each end of a runway. That at the downwind end can therefore be lowered and that at the upwind end raised when an aircraft of the type the net is suitable for is landing or taking off. A problem, however, with known nets of this type is that the range of aircraft for which each one is suitable is very limited.

A typical net having just this problem is that described in U.K. Pat. No. 950,192. This comprises a plurality of subnets each consisting of a top edge member, a bottom edge member and a plurality of vertical members equally spaced apart and extending normally between the edge members, the subnets being constructed so that when bunched together the vertical members of one subnet are staggered relative to those of the next. It is an object of the present invention to provide an aircraft arrester net which is suitable for use with a wider size, weight and shape range than nets hitherto known or used.

SUMMARY OF THE INVENTION

According to the present invention an arrester net comprises at least two groups of subnets, each subnet comprising a top edge member and a bottom edge member and a plurality of members hereinafter called vertical members extending substantially at right angles to and between the top and bottom edge members, the vertical members in one group of subnets being more widely spaced apart than those in another, and each group being arranged so that the vertical members of any subnet therein are staggered with respect to the vertical members of the other subnets.

In order that protruding parts of the aircraft, such as the nose, may penetrate the net without damaging it, the arrangement of the net with its staggered vertical elements may be such that the area presented comprises more hole than net elements, ie it presents a reticulated appearance.

According to a feature of the invention there are more subnets in the group whose vertical elements are the more widely spaced than there are in the other group or groups.

The net is preferably constructed to extend at least substantially across the width of a runway (though it may be sited off the end of the runway) with the distance between top and bottom edge members such that aircraft using the runway can be caught without the top edge members entering the cockpit of the aircraft.

One embodiment of the invention has just two groups of subnets, a major group the vertical members of each of whose subnets are 3½ m to 6 m apart, and a minor group the vertical members to whose subnets are 1 m to 3 m apart. It is intended that the net will be deployed with the major group upstream of the minor. Preferably all of the top edge members are bunched together by frangible ties which remain intact for normal erection and lowering of the net but which break during enmeshment of an aircraft. The bottom edge members may be similarly bunched together and also attached by frangible ties to the ground.

The net may be slung between stanchions on either side of the runway which support it at such a height above the minimum that when wet the top edge members will still be at or above minimum height. The top and bottom edge members may join one another at the sides of the runway and be connected to energy absorption means such as rotary hydraulic arrester gear etc. The attachment of the net to the stanchions is thus preferably frangible when the net is engaged by an aircraft. This may be realised in a breakaway unit having a frangible member taking the load of the net as a whole and at the same time in frangible links between the breakaway unit and each subnet. The stanchions may be associated with remotely and locally controlled gear to be raised and lowered for deploying and stowing the net.

While each net member may be made of steel wire or natural or man-made fibre rope, a nylon tape has the advantage of minimising damage to the aircraft. Because the net material is likely to degrade with exposure to weather, the net may have a removable redundant sample member whose strength may be tested from time to time.

Nets in accordance with the present invention thus have the advantage over the known nets of permitting some modification of the decelerative force in accordance with the size of the aircraft. Small aircraft may slip through at least some of the subnets of the major group, or at least stretch them less than the minor subnets. This means that nets in accordance with the invention can be used satisfactorily with a wider size range of aircraft than nets hitherto.

BRIEF DESCRIPTION OF THE DRAWINGS

An arrester net in accordance with the present invention will now be described by way of example with reference to the accompanying drawings, of which.

DESCRIPTION OF THE PREFERRED EMBODIMENT

Figure 1:
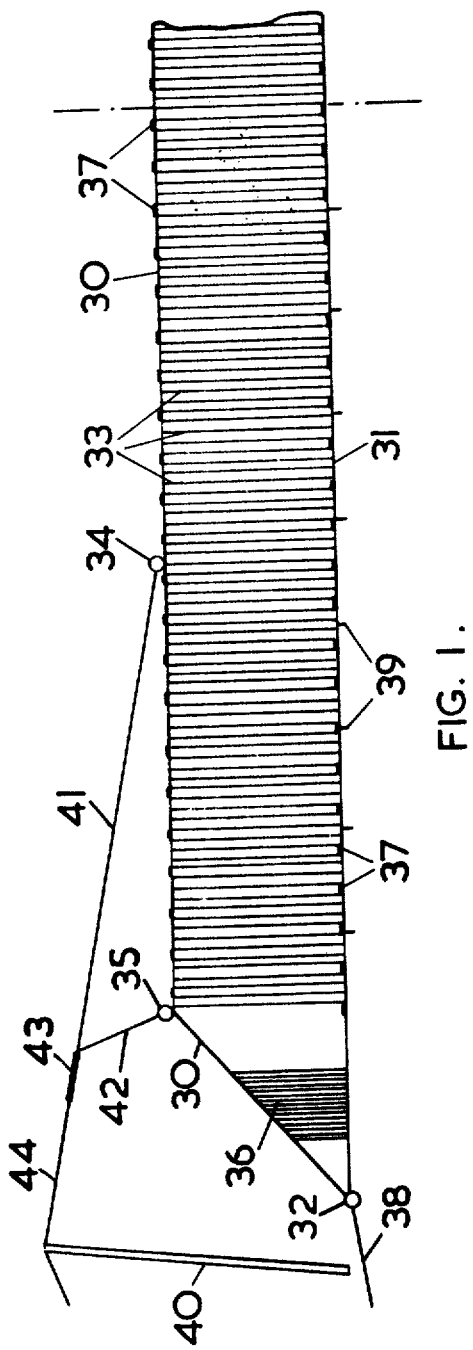
FIG. 1 is a front elevation of part of the net.
Figure 2:
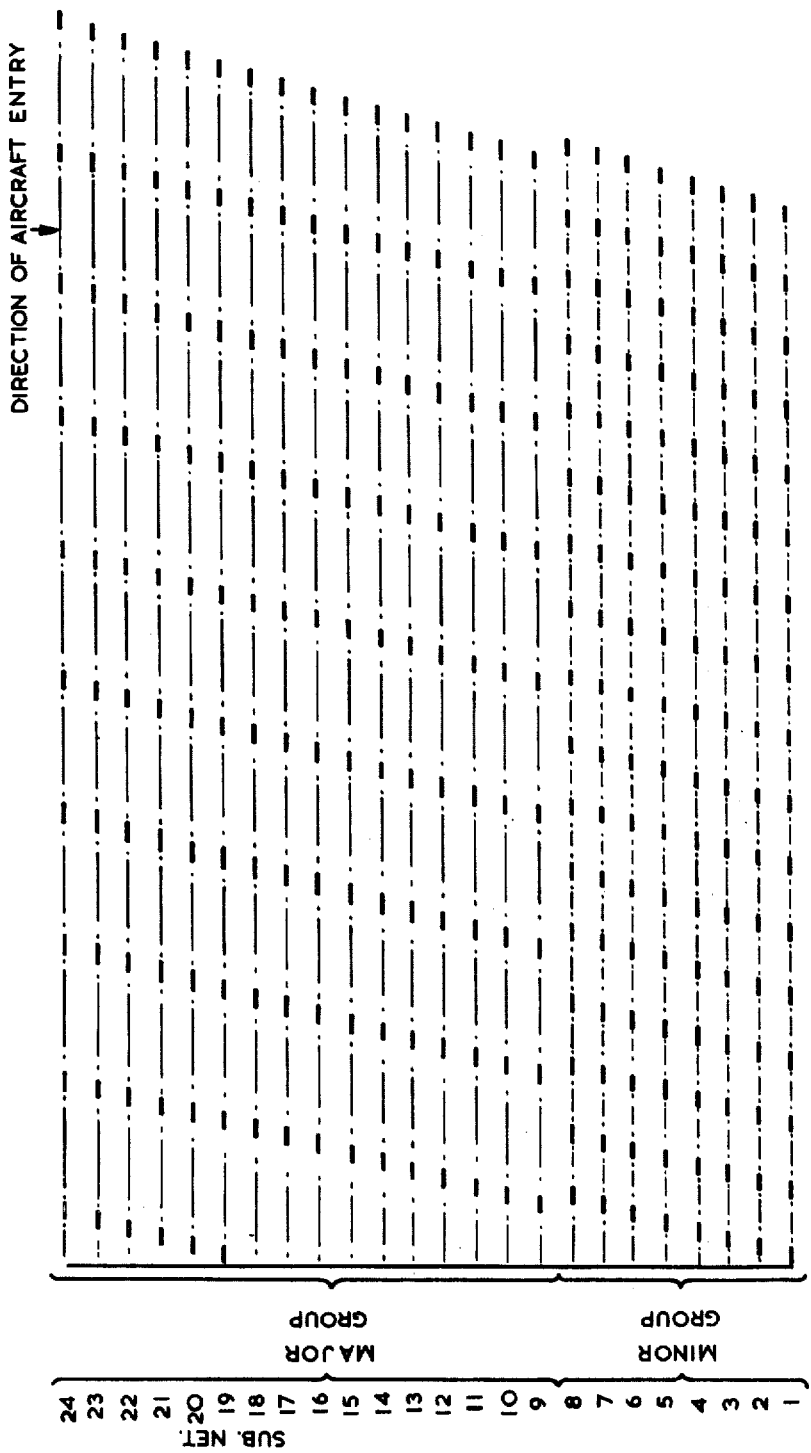
FIG. 2 illustrates the layout of vertical members in the subnets.

As shown in FIGS. 1 & 2 the net comprises a minor group of 8 subnets 1 to 8 and a major group of 16 subnets 9 to 24. Each subnet has a top edge member 30 and a bottom edge member 31 traversing the runway and joined together at each side at 32. A plurality of vertical members 33 extend from the top edge to the bottom edge members. There are equally spaced 4.16 m apart in a major group subnet and 2.08 m apart in a minor group subnet. The vertical members 33 in successive subnets are staggered, as shown in FIG, 2 by 0.26 m. The length of each vertical is about 4.5 m.

Each subnet has suspension loops 34 and 35 respectively at the quarter span points and at the outer ends of the elevated run of the top edge member 30. The subnets also each have a test sample vertical member 36 outboard of the suspension loop 35, and these too are in staggered relationship. The subnets are linked together by frangible ties 37 of adhesive tape which secure all the top edge members 30 together and all the bottom edge members 31 also.

Figure 3:
FIG. 3 illustrates the location of ground ties on the runway.

The arrangement at 32 when the net is installed on the runway is that the subnets are grouped together in 3 groups, the minor group, subnets 9–16, and 17–24. A coupling connects the 3 groups to a purchase tape 38 which is associated with an energy absorption device (not shown). Each subnet is separately secured to the runway by 17 frangible ties 39 spaced 2.75 m apart. These ties are arranged in a shallow curve which is convex facing upstream, as illustrated in FIG. 3. The net is held erect by a stanchion 40 and an associated support bridle on each side of the runway.

The support bridle comprises nylon tapes 41 and 42 connected frangible at their one ends respectively to the suspension loops 34 and 35 and connected at their other ends to fail safe device in the form of a breakaway unit 43. The breakaway unit includes a brass pin which is frangible when overloaded by a predetermined amount. The breakaway unit in turn is attached to a steel guy rope 44 passing over the stanchion 40.

Standard remote and/or local controlled net raising/lowering means (not shown) are provided associated with the stanchions 40 and the guy ropes 44.

When the net is deployed as described and illustrated engagement by an aircraft will firstly cause successive failure of most or all of the frangible ties 37 and 39, 34 and 35. Further forward movement of the aircraft will be reacted via the purchase tapes 38 by an energy absorption apparatus which will act to bring the aircraft to a halt. Thus the deceleration forces on the aircraft include those required to stretch the net members, to break the frangible ties and to pay out the energy absorption apparatus.

An aircraft of span less than about 25–30 ft (8–10 m), depending on the sweep of the wing, may pass through some of the major group subnets, and may stretch very little some of the other subnets in that group. Such a small aircraft will be mainly engaged by the minor group of subnets which will therefore stretch the more. Thus the decelerative force, particularly the shock loading, on a small aircraft will be abated to some extent compared with that on a large aircraft which will be engaged by the whole net.

If either of the frangible connections 34 or 35 fails to break the breakaway units 43 will fail.

In a preferred example a net with a bottom edge member 58 m long uses 44 KN breaking point nylon tape, width 44 mm on all members except the purchase tapes 38. The frangible ground anchor ties comprise 445N breaking strength nylon cord.

I claim:

1. An arrester net comprising at least two groups of subnets, each subnet comprising a top edge member and a bottom edge member and a plurality of vertical members extending normally between said top and bottom edge members, there being a major group of subnets the vertical members of each of the subnets thereof being 3½ m to 6 m apart, and a minor group the vertical members of each of the subnets thereof being 1 m to 3 m apart, said subnets being superposed one upon another with said top edge members bunched together and said bottom edge members bunched together and with the vertical members of substantially each subnet staggered in respect to those of the next adjacent subnet.

2. An arrester net as claimed in claim 1 and having just two groups of subnets.

3. An arrester net as claimed in claim 1 and wherein said top edge members are bunched together with frangible ties which remain intact during erection of the net but break during enmeshment of an aircraft.

4. An arrester net as claimed in claim 1 and wherein said bottom edge members are bunched together with frangible ties which remain intact during erection but which break during enmeshment of an aircraft.

5. A net as claimed in claim 1 and wherein said top and bottom edge members have connectors at both ends thereof for connection to energy absorption means and said top edge members have frangible connectors for connection to net support means.

6. A net as claimed in claim 5 having a breakaway unit in series with said frangible connectors on said top edge members.

7. A net as claimed in claim 1 and wherein said top and bottom edge and vertical members comprise a man-made fibre fabric tape.

8. A net as claimed in claim 1 and wherein there are more subnets in the group whose vertical elements are the more widely spaced than there are in the other group or groups, said vertical members being fabricated of a nylon tape, said subnets being superposed one upon the other with said top edge members bunched together with frangible ties and said bottom edge members bunched together with frangible ties, said top and bottom edge members being linked together at each end of the net and adapted for connection to energy absorption means, frangible connectors attached to said top edge members for connection thereof to support means, and said subnets being constructed so that when superposed the vertical members of substantially any subnet are staggered with respect to those of the next adjacent subnet.

9. An aircraft arrester net comprising a major group and a minor group of subnets, there being at least as many subnets to a major group as to a minor group, each subnet comprising a top edge member and a bottom edge member and a plurality of vertical members extending normally between said top and bottom edge members, said members being fabricated of a nylon tape, the vertical members in each subnet of the major group being 3½ m to 6 m apart and of the minor group 1 m to 3 m apart, said subnets being superposed one upon another with said top edge members bunched together with frangible ties and said bottom edge members bunched together with frangible ties, said top and bottom edge members being linked together at each end of the net and adapted for connection to energy absorption means, frangible connectors attached to said top edge members for connection thereof to support means, and said subnets being constructed so that when superposed the vertical members of substantially any subnet are staggered with respect to those of the next adjacent subnet.

10. An aircraft arrester system comprising a net as claimed in claim 9, frangible ties connecting said bottom edge members to ground, an erectable stanchion at each end of the net and linked with the appropriate frangible connectors, and energy absorption means, located one at each end of the net and connected with said top and bottom edge members at the appropriate ends thereof, the net being arranged with the major group upstream.

* * * * *